(12) United States Patent
Harmon et al.

(10) Patent No.: US 11,475,717 B2
(45) Date of Patent: Oct. 18, 2022

(54) SYSTEM AND METHOD FOR DETECTING WORN OR DAMAGED COMPONENTS OF AN AGRICULTURAL MACHINE BASED ON ACOUSTIC DATA

(71) Applicant: CNH Industrial America LLC, New Holland, PA (US)

(72) Inventors: Joshua David Harmon, Lititz, PA (US); Huiyan Wu, Downingtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 322 days.

(21) Appl. No.: 16/245,607

(22) Filed: Jan. 11, 2019

(65) Prior Publication Data

US 2020/0226851 A1    Jul. 16, 2020

(51) Int. Cl.
  *G07C 5/00* (2006.01)
  *A01B 35/32* (2006.01)
  *G07C 5/08* (2006.01)

(52) U.S. Cl.
  CPC .............. *G07C 5/006* (2013.01); *A01B 35/32* (2013.01); *G07C 5/0833* (2013.01)

(58) Field of Classification Search
  CPC .... G07C 5/006; G07C 5/0833; G07C 5/0816; A01B 35/32; A01B 76/00; A01B 49/027
  See application file for complete search history.

(56) References Cited

U.S. PATENT DOCUMENTS 4,275,546 A * 6/1981 Bohman .............. A01D 75/187
                                                     460/2
5,805,080 A   9/1998 Lemoine et al.
5,831,542 A   11/1998 Thomas et al.
(Continued)

FOREIGN PATENT DOCUMENTS

JP       2004125776 A  *  4/2004
WO   WO2011138488        11/2011

OTHER PUBLICATIONS

English Translation of Foreign Reference "JP-2004125776-A".*
(Continued)

*Primary Examiner* — Rami Khatib
*Assistant Examiner* — Shahira Baajour
(74) *Attorney, Agent, or Firm* — Rebecca L. Henkel; Rickard K. DeMille (57) ABSTRACT

In one aspect, a system for detecting worn or damaged components of an agricultural machine may include first and second acoustic sensors positioned at first and second locations on the agricultural machine, respectively, with the second location being spaced apart from the first location. A controller of the system may be configured to determine a first acoustic parameter associated with the first location of the agricultural machine based on acoustic data received from the first acoustic sensor. The controller may also be configured to determine a second acoustic parameter associated with the second location of the agricultural machine based on acoustic data received from the second acoustic sensor. Furthermore, the controller may be configured to determine a component of the agricultural machine is worn or damaged when the first acoustic parameter differs from the second acoustic parameter by a predetermined amount.

16 Claims, 5 Drawing Sheets

(56) References Cited

U.S. PATENT DOCUMENTS

| | | |
|---|---|---|
| 6,507,790 B1 | 1/2003 | Radomski |
| 6,778,894 B2 | 8/2004 | Beck et al. |
| 6,843,044 B2 | 1/2005 | Clauss |
| 7,520,111 B2 | 4/2009 | Berger et al. |
| 7,993,187 B2 | 8/2011 | Ricketts et al. |
| 8,950,260 B2 | 2/2015 | Gelinske et al. |
| 9,474,208 B2 | 10/2016 | Batcheller et al. |
| 9,591,959 B2 | 3/2017 | Landry et al. |
| 9,631,964 B2 | 4/2017 | Gelinske et al. |
| 9,807,933 B2 | 11/2017 | Boyd |
| 10,058,029 B2 | 8/2018 | Lutz |
| 2005/0173354 A1 | 8/2005 | Binot et al. |
| 2006/0020402 A1* | 1/2006 | Bischoff .................. G07C 3/00 702/34 |
| 2008/0295471 A1 | 12/2008 | Pollklas et al. |
| 2014/0311762 A1* | 10/2014 | Behmlander ......... E02F 3/8152 172/430 |
| 2016/0088787 A1* | 3/2016 | Connell ............... A01B 63/112 701/50 |

OTHER PUBLICATIONS

Wireless Blockage and Flow Monitor, Intelligent Agricultural Solutions, https://www.triangleag.com/support/IAS/IAS_WBM_Onesheet_V2.6_webTriangle.pdf, 2 pages.

* cited by examiner

SYSTEM AND METHOD FOR DETECTING WORN OR DAMAGED COMPONENTS OF AN AGRICULTURAL MACHINE BASED ON ACOUSTIC DATA

FIELD OF THE INVENTION

The present disclosure generally relates to agricultural machines and, more particularly, to systems and methods for detecting worn or damaged components of an agricultural machine based on acoustic data received from different locations on the machine.

BACKGROUND OF THE INVENTION

Various components of a work vehicle, an agricultural implement, or other agricultural machine may incur wear and/or damage during the performance of an agricultural operation. For example, the bearings of the vehicle and/or implement may incur wear during agricultural operations. Furthermore, contact with large or immovable rocks may cause wear and/or damage to the ground engaging tools of the implement. Such contact or collisions may cause the sound or noise emitted by the ground engaging tools to change. Furthermore, when components of the vehicle and/or implement become worn or damaged (e.g., due to contact or collisions with large or immovable rocks), the sound or noise emitted by the operation of such components may change. For example, the intensity of the sound emitted by the operation of a worn bearing is generally much greater than the intensity of the sound emitted by a non-worn bearing. However, operators are typically unable to hear the sounds emitted by worn or damaged components of the work vehicle or implement from the cab of the vehicle.

Accordingly, an improved system and method for detecting worn or damaged components of an agricultural machine would be welcomed in the technology. In particular, a system and method for detecting worn or damaged components of an agricultural machine based on the sounds or noises emitted by such components would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting worn or damaged components of an agricultural machine. The system may include a first acoustic sensor positioned at a first location on the agricultural machine and a second acoustic sensor positioned at a second location on the agricultural machine, with the second location being spaced apart from the first location. The system may also include a controller communicatively coupled to the first acoustic sensor and the second acoustic sensor. The controller may be configured to determine a first acoustic parameter associated with the first location of the agricultural machine based on acoustic data received from the first acoustic sensor. The controller may also be configured to determine a second acoustic parameter associated with the second location of the agricultural machine based on acoustic data received from the second acoustic sensor. Furthermore, the controller may be configured to determine a component of the agricultural machine is worn or damaged when the first acoustic parameter differs from the second acoustic parameter by a predetermined amount.

In another aspect, the present subject matter is directed to an agricultural implement. The implement may include a first ground engaging tool positioned at a first location on the agricultural machine and a second ground engaging tool positioned at a second location on the agricultural machine, with the second location being spaced apart from the first location. The implement may also include a first acoustic sensor positioned adjacent to the first location on the agricultural machine and a second acoustic sensor positioned adjacent to the second location on the agricultural machine. Furthermore, the implement may include a controller communicatively coupled to the first acoustic sensor and the second acoustic sensor. The controller may be configured to determine a first acoustic parameter associated with the first ground engaging tool based on acoustic data received from the first acoustic sensor. The controller may also be configured to determine a second acoustic parameter associated with the second ground engaging tool based on acoustic data received from the second acoustic sensor. Furthermore, the controller may be configured to determine one of the first ground engaging tool or the second ground engaging tool is worn or damaged when the first acoustic parameter differs from the second acoustic parameter by a predetermined amount.

In a further aspect, the present subject matter is directed to a method for detecting worn or damaged components of an agricultural machine. The agricultural machine may include a first acoustic sensor positioned at a first location on the agricultural machine and a second acoustic sensor positioned at a second location on the agricultural machine, with the second location being spaced apart from the first location. The method may include determining, with a computing device, a first acoustic parameter associated with a first location of the agricultural machine based on acoustic data received from the first acoustic sensor. The method may also include determining, with the computing device, a second acoustic parameter associated with the second location of the agricultural machine based on acoustic data received from the second acoustic sensor. Furthermore, the method may include determining, with the computing device, a component of the agricultural machine is worn or damaged when the first acoustic parameter differs from the second acoustic parameter by a predetermined amount. Additionally, the method may include initiating, with the computing device, a control action when it is determined the component of the agricultural machine is worn or damaged.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting worn or damaged components of an agricultural machine. Specifically, in several embodiments, a controller of the disclosed system may be configured to receive acoustic data from a plurality of acoustic sensors mounted at different locations on the agricultural machine. The acoustic sensors may, in turn, be configured to detect sounds emitted by components of the agricultural machine positioned adjacent to their respective mounting locations. Based on the received acoustic data, the controller may be configured to determine a plurality of acoustic parameters (e.g., amplitudes, frequencies, pitches, and/or intensities) associated with the sounds detected at the locations of the acoustic sensors. When the machine components adjacent to the acoustic sensor are operating properly, the associated acoustic parameters may generally be the same or similar. However, when the acoustic parameters differ significantly, one or more of the components positioned adjacent to the acoustic sensors may be worn out or damaged. As such, the controller may be configured to determine that one or more components of the agricultural machine are worn or damaged when the acoustic parameters differ by at least a predetermined amount. In such instances, the controller may be configured to initiate one or more control actions, such as notifying an operator of the agricultural machine that one or more components of the machine are worn/damaged and/or adjusting one or more operating parameters of the machine in a manner that reduces further wear/damage.

Figure 1:
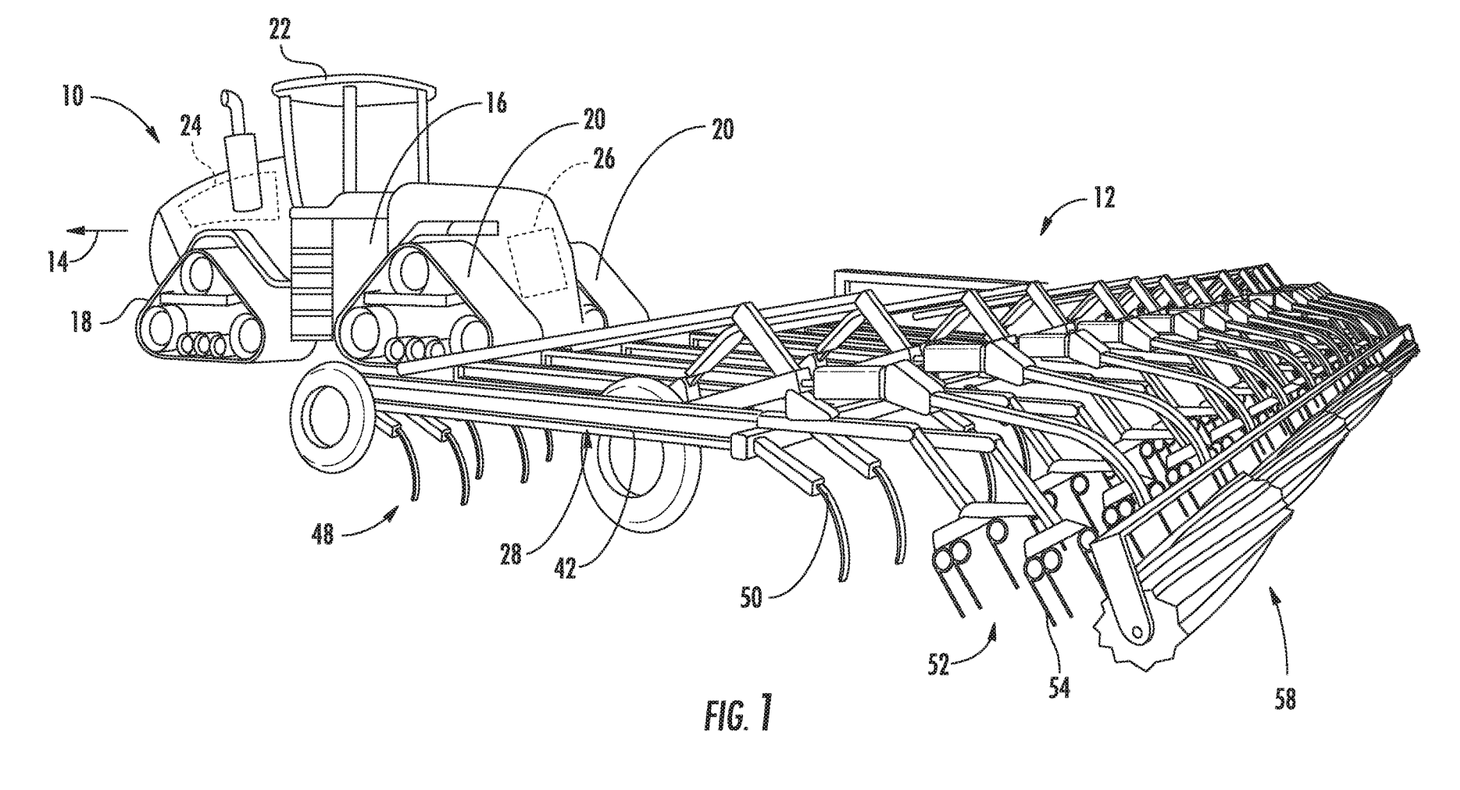
FIG. 1 illustrates a perspective view of one embodiment of an agricultural machine including a work vehicle and an associated agricultural implement in accordance with aspects of the present subject matter.
Figure 2:
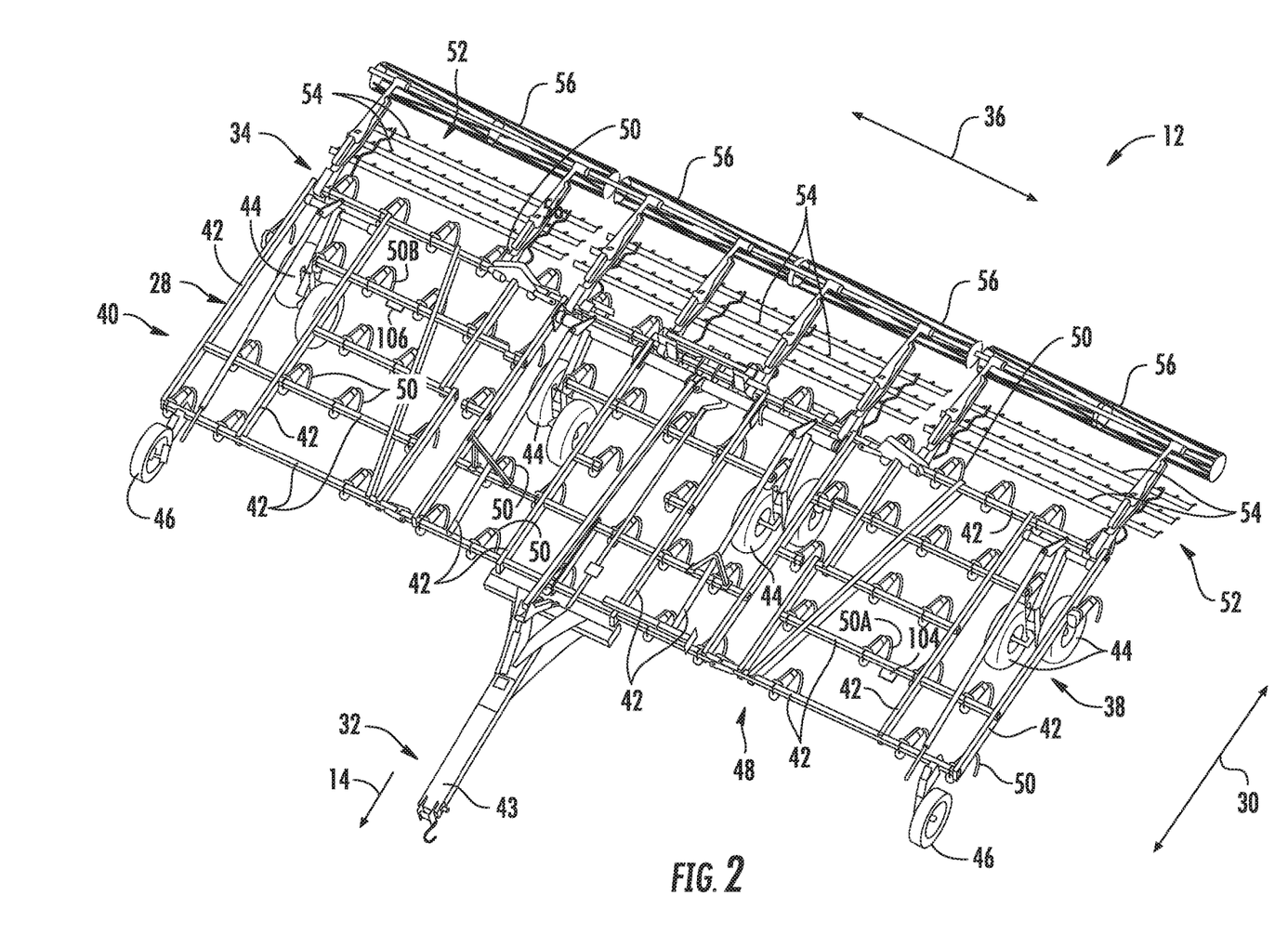
FIG. 2 illustrates an alternative perspective view of the agricultural machine shown in FIG. 1, particularly illustrating various components of the agricultural implement in accordance with aspects of the present subject matter.

Referring now to the drawings, FIGS. 1 and 2 illustrate differing perspective views of one embodiment of an agricultural machine in accordance with aspects of the present subject matter. Specifically, FIG. 1 illustrates a perspective view of the agricultural machine including a work vehicle 10 and an associated agricultural implement 12. Additionally, FIG. 2 illustrates a perspective view of the agricultural machine, particularly illustrating various components of the implement 12.

In the illustrated embodiment, the agricultural machine corresponds to the combination of the work vehicle 10 and the associated agricultural implement 12. As shown in FIGS. 1 and 2, the vehicle 10 corresponds to an agricultural tractor configured to tow the implement 12, namely a tillage implement (e.g., a cultivator), across a field in a direction of travel (e.g., as indicated by arrow 14 in FIG. 1). However, in other embodiments, the agricultural machine may correspond to any other suitable combination of work vehicle (e.g., an agricultural harvester, a self-propelled sprayer, and/or the like) and agricultural implement (e.g., such as a seeder, fertilizer, sprayer (a towable sprayer or a spray boom of a self-propelled sprayer), mowers, and/or the like). In addition, it should be appreciated that, as used herein, the term "agricultural machine" may refer not only to combinations of agricultural implements and vehicles, but also to individual agricultural implements and/or vehicles.

As shown in FIG. 1, the vehicle 10 may include a frame or chassis 16 configured to support or couple to a plurality of components. For example, a pair of front track assemblies 18 (one is shown) and a pair of rear track assemblies 20 may be coupled to the frame 16. The track assemblies 18, 20 may, in turn, be configured to support the vehicle 10 relative to the ground and move the vehicle 10 in the direction of travel 14 across the field. Furthermore, an operator's cab 22 may be supported by a portion of the frame 16 and may house various input devices (e.g., a user interface 102 shown in FIG. 3) for permitting an operator to control the operation of one or more components of the vehicle 10 and/or the implement 12. However, in other embodiments, the vehicle 10 may include wheels (not shown) in place of the front and/or rear track assemblies 18, 20.

Furthermore, the vehicle 10 may include one or more devices for adjusting the speed at which the vehicle/implement 10/12 moves across the field in the direction of travel 14. Specifically, in several embodiments, the vehicle 10 may include an engine 24 and a transmission 26 mounted on the frame 16. In general, the engine 24 may be configured to generate power by combusting or otherwise burning a mixture of air and fuel. The transmission 26 may, in turn, be operably coupled to the engine 24 and may provide variably adjusted gear ratios for transferring the power generated by the engine 24 to the track assemblies 18, 20. For example, increasing the power output by the engine 24 (e.g., by increasing the fuel flow to the engine 24) and/or shifting the transmission 26 into a higher gear may increase the speed at which the vehicle/implement 10/12 moves across the field. Conversely, decreasing the power output by the engine 24 (e.g., by decreasing the fuel flow to the engine 24) and/or shifting the transmission 26 into a lower gear may decrease the speed at which the vehicle/implement 10/12 moves across the field.

As shown in FIGS. 1 and 2, the implement 12 may include an implement frame 28. More specifically, the frame 28 may extend along a longitudinal direction 30 between a forward end 32 and an aft end 34. The frame 28 may also extend along a lateral direction 36 between a first side 38 and a second side 40. In this respect, the frame 28 generally includes a plurality of structural frame members 42, such as beams, bars, and/or the like, configured to support or couple to a plurality of components. Furthermore, a hitch assembly 43 may be connected to the frame 28 and configured to couple the implement 12 to the vehicle 10. Additionally, a plurality of wheel assemblies may be coupled to the frame 28, such as a set of centrally located wheels 44 and a set of front pivoting wheels 46, to facilitate towing the implement 12 in the direction of travel 14.

In several embodiments, the frame 28 may be configured to support a cultivator 48, which may be configured to till or otherwise break the soil over which the implement 12 travels to create a seedbed. In this respect, the cultivator 48 may include a plurality of ground engaging shanks 50, which are pulled through the soil as the implement 12 moves across the field in the direction of travel 14. In one embodiment, the ground engaging shanks 50 may be configured to be pivotally mounted to the frame 28 in a manner that permits the penetration depths of the ground engaging shanks 50 to be adjusted.

Moreover, as shown in FIGS. 1 and 2, the implement 12 may also include one or more harrows 52. Specifically, in several embodiments, each harrow 52 may include a plurality of ground engaging tines 54 configured to engage to the surface of the soil within the field in a manner that levels or otherwise flattens any windrows or ridges in the soil created by the cultivator 48. As such, the ground engaging tines 54 may be configured to be pulled through the soil as the implement 12 moves across the field in the direction of travel 14. It should be appreciated that the implement 12 may include any suitable number of harrows 52.

Additionally, in one embodiment, the implement 12 may include one or more baskets or rotary firming wheels 56. In general, the basket(s) 56 may be configured to reduce the number of clods in the soil and/or firm the soil over which the implement 12 travels. As shown, each basket 56 may be configured to be pivotally coupled to one of the harrows 52. Alternatively, the basket(s) 56 may be configured to be pivotally coupled to the frame 28 or any other suitable location of the implement 12. It should be appreciated that the implement 12 may include any suitable number of baskets 56.

In accordance with aspects of the present subject matter, a plurality of acoustic sensors may be provided in operative association with the vehicle 10 and/or the implement 12. Specifically, in several embodiments, a first acoustic sensor 104 may be provided at a first location of the implement 12 and a second acoustic sensor 106 may be provided at a second location of the implement 12. As such, the first and second acoustic sensors 104, 106 may be configured to capture acoustic data indicative of the sound(s) or noise(s) present at the first and second locations, respectively. Such sound(s) may be generated by adjacent components of the implement 12. For example, as shown, in the illustrated embodiment, the first acoustic sensor 104 is positioned adjacent to a first shank 50A of the implement 12, while the second acoustic sensor 106 is positioned adjacent to a second shank 50B of the implement 12. In such embodiment, the first acoustic sensor 104 may be configured to capture acoustic data associated with the sound generated by the first shank 50A during the operation of the implement 12. Similarly, the second acoustic sensor 106 may be configured to capture acoustic data associated with the sound generated by the second shank 50B during the operation of the implement 12. As will be described below, a differential in one or more acoustic parameters (e.g., amplitudes, frequencies, pitches, and/or intensities) of the data captured by the first and second acoustic sensors 104, 106 may be indicative of wear or damage to the first and/or second shanks 50A, 50B.

In several embodiments, the first and second acoustic sensors 104, 106 may be spaced apart from each other. For example, as shown in FIG. 2, in the illustrated embodiment, the first acoustic sensor 104 is positioned adjacent to the forward end 32 and the first side 38 of the implement frame 28. Conversely, the second acoustic sensor 106 is positioned adjacent to the aft end 34 and the second side 40 of the implement frame 28. As such, in the illustrated embodiment, the first and second acoustic sensors 104, 106 are spaced apart from each other along the longitudinal and lateral directions 30, 36. However, in another embodiment, the first and second acoustic sensors 104, 106 may be spaced apart from each other along the longitudinal direction 30 and aligned with each other along the lateral direction 36. For example, in such embodiment, the first and second acoustic sensors 104, 106 may be positioned adjacent to components of the implement 12 (e.g., shanks 50) that are similarly spaced apart from each other along the longitudinal direction 30 and aligned with each other along the lateral direction 36. In a further embodiment, the first and second acoustic sensors 104, 106 may be aligned with each other along the longitudinal direction 30 and spaced apart from each other along the lateral direction 36. For example, in such embodiment, the first and second acoustic sensors 104, 106 may be positioned adjacent to components of the implement 12 (e.g., shanks 50) that are similarly aligned with each other along the longitudinal direction 30 and spaced apart from each other along the lateral direction 36.

It should be appreciated that the first and second acoustic sensors 104, 106 may be positioned at any suitable locations on the vehicle 10 and/or implement 12. As described above, in the illustrated embodiment, the first and second acoustic sensors 104, 106 are positioned adjacent to the first and second shanks 50A, 50B. However, the first and second acoustic sensors 104, 106 may be positioned adjacent to any other components of the implement 12. For example, in other embodiments, the first and second acoustic sensors 104, 106 may be positioned adjacent to other shanks 50, the wheels 44, 46, the harrows 52, the baskets 56, and/or the actuators, bearings, valves, and/or the like associated with such components 44, 46, 50, 52, 56. Furthermore, in some embodiments, the first and second acoustic sensors 104, 106 may be provided in operative association with the vehicle 10 such that the sensors 104, 106 are able to detect the sound(s) emitted by the hydraulic remotes or other valves, the power take-off unit, the actuators, the bearings, and/or other suitable components of the vehicle 10. In one embodiment, the first and second acoustic sensors 104, 106 may be acoustically isolated from the engine 24 to prevent the sounds generated by the engine 24 during normal operation from masking the sounds generated by the valves, actuators, and/or bearings of the vehicle 10. Furthermore, although FIG. 2 only illustrates two acoustic sensors, the vehicle 10 and/or implement 12 may include any other suitable number of acoustic sensors, such as three or more acoustic sensors.

Moreover, it should be appreciated that the acoustic sensors may correspond to any suitable sensing devices configured to detect or capture acoustic data indicative of the sounds emitted by the adjacent components of the vehicle 10 and/or the implement 12. For example, in several embodiments, the acoustic sensors may correspond to suitable microphones, such as capacitor microphones, electret microphones, moving-coil microphones, piezoelectric microphones, and/or the like. However, in alternative embodiments, the acoustics sensors may correspond to acoustic accelerometers or any other suitable type of acoustic sensor.

Additionally, it should be appreciated that the configuration of the vehicle/implement 10/12 described above and shown in FIGS. 1 and 2 is provided only to place the present subject matter in an exemplary field of use. Thus, it should be appreciated that the present subject matter may be readily adaptable to any manner of machine configuration.

Figure 3:
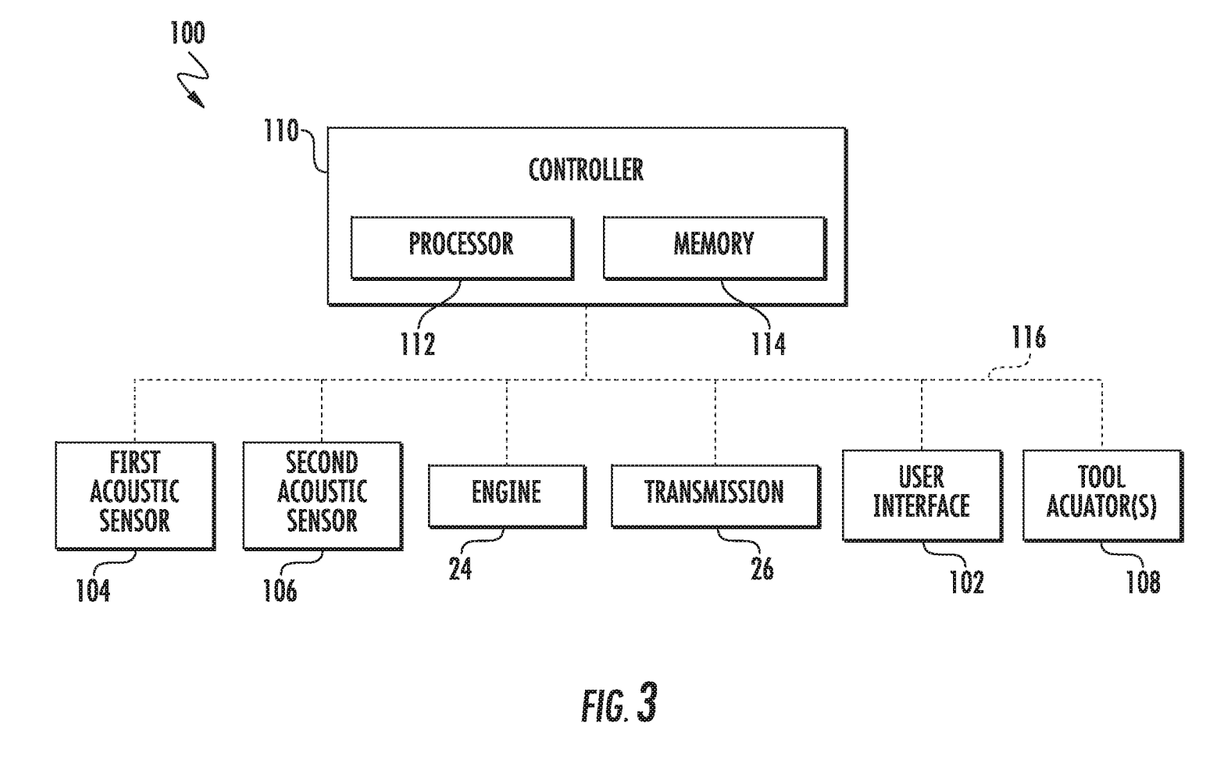
FIG. 3 illustrates a schematic view of one embodiment of a system for detecting worn or damaged components of an agricultural machine in accordance with aspects of the present subject matter.

Referring now to FIG. 3, a schematic view of one embodiment of a system 100 for detecting worn/damaged components of an agricultural machine is illustrated in accordance with aspects of the present subject matter. In general, the system 100 will be described herein with reference to the vehicle/implement 10/12 described above with reference to FIGS. 1 and 2. However, it should be appreciated by those of ordinary skill in the art that the disclosed system 100 may generally be utilized with agricultural machines having any other suitable machine configuration. Additionally, it should be appreciated that communicative links or electrical couplings of the system 100 shown in FIG. 3 are indicated by dashed lines.

As shown in FIG. 3, the system 100 may include one or more tool actuators 108 of the work vehicle 10 and/or the implement 12. Specifically, each actuator 108 may be configured to adjust to the position or orientation of a ground engaging tool of implement 12, such as one of the shanks 50, the harrows 52, and/or the baskets 56, relative to the implement frame 28. For example, in one embodiment, a first end of each actuator 108 (e.g., a rod of each actuator 108) may be coupled to the tool, while a second end of each actuator 108 (e.g., the cylinder of each actuator 108) may be coupled to the implement frame 28. The rod of each actuator 108 may be configured to extend and/or retract relative to the corresponding cylinder to adjust the position or orientation of the tool relative to the implement frame 28. In one embodiment, the actuator(s) 108 corresponds to a fluid-driven actuator(s), such as a hydraulic or pneumatic cylinder(s). However, it should be appreciated that the actuator(s) 108 may correspond to any other suitable type of actuator(s), such as an electric linear actuator(s).

In accordance with aspects of the present subject matter, the system 100 may include a controller 110 positioned on and/or within or otherwise associated with the vehicle 10 and/or implement 12. In general, the controller 110 may comprise any suitable processor-based device known in the art, such as a computing device or any suitable combination of computing devices. Thus, in several embodiments, the controller 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the controller 110 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 114 may generally be configured to store suitable computer-readable instructions that, when implemented by the processor(s) 112, configure the controller 110 to perform various computer-implemented functions.

In addition, the controller 110 may also include various other suitable components, such as a communications circuit or module, a network interface, one or more input/output channels, a data/control bus and/or the like, to allow controller 110 to be communicatively coupled to any of the various other system components described herein (e.g., the engine 24, the transmission 26, the first acoustic sensor 104, the second acoustic sensor 106, and/or the tool actuator(s) 108). For instance, as shown in FIG. 3, a communicative link or interface 116 (e.g., a data bus) may be provided between the controller 110 and the components 24, 26, 104, 106, 108 to allow the controller 110 to communicate with such components 24, 26, 104, 106, 108 via any suitable communications protocol (e.g., CANBUS).

It should be appreciated that the controller 110 may correspond to an existing controller(s) of the work vehicle 10 and/or the implement 12, itself, or the controller 110 may correspond to a separate processing device. For instance, in one embodiment, the controller 110 may form all or part of a separate plug-in module that may be installed in association with the work vehicle 10 and/or the implement 12 to allow for the disclosed systems and methods to be implemented without requiring additional software to be uploaded onto existing control devices of the vehicle 10 and/or the implement 12. It should also be appreciated that the functions of the controller 110 may be performed by a single processor-based device or may be distributed across any number of processor-based devices, in which instance such devices may be considered to form part of the controller 110. For instance, the functions of the controller 110 may be distributed across multiple application-specific controllers, such as an engine controller, a transmission controller, an implement controller, and/or the like.

Furthermore, in one embodiment, the system 100 may also include a user interface 102. More specifically, the user interface 102 may be configured to provide feedback (e.g., notifications associated with worn or damaged components of the vehicle 10 and/or the implement 12) to the operator of the vehicle/implement 10/12. As such, the user interface 102 may include one or more feedback devices (not shown), such as display screens, speakers, warning lights, and/or the like, which are configured to provide feedback from the controller 110 to the operator. The user interface 102 may, in turn, be communicatively coupled to the controller 110 via the communicative link 116 to permit the feedback to be transmitted from the controller 110 to the user interface 102. In addition, some embodiments of the user interface 102 may include one or more input devices (not shown), such as touchscreens, keypads, touchpads, knobs, buttons, sliders, switches, mice, microphones, and/or the like, which are configured to receive user inputs from the operator. In one embodiment, the user interface 102 may be positioned within the cab 22 of the vehicle 10. However, in alternative embodiments, the user interface 102 may have any suitable configuration and/or be positioned in any other suitable location.

In several embodiments, the controller 110 may be configured to determine a plurality of acoustic parameters. More specifically, as indicated above, a plurality of acoustic sensors may be mounted on the vehicle 10 and/or the implement 12. Each acoustic sensor may, in turn, be positioned adjacent to more or more of the vehicle 10 and/or implement 12 (e.g., bearings, actuators, valves, ground engaging tools, and/or the like) that generate sounds or noises during an agricultural operation. In this regard, the controller 110 may be configured to receive acoustic data from each of the acoustic sensors (e.g., via the communicative link 116). Thereafter, the controller 110 may be configured to analyze/process the received acoustic data to determine one or more acoustic parameters associated with the sounds generated by the adjacent vehicle/implement components (i.e., the sounds present at the location of each acoustic sensor). For instance, the controller 110 may include a look-up table(s), suitable mathematical formula, and/or algorithms stored within its memory 114 that correlates the received acoustic data to the acoustic parameters.

It should be appreciated that the determined acoustic parameters may correspond to any suitable parameters associated with the sound(s) present at the location of the corresponding acoustic sensor. For example, in one embodiment, the determined acoustic parameters may be the amplitude, frequency, pitch, and/or intensity of the sounds or noises detected by the acoustic sensors. However, it should be appreciated that, in alternative embodiments, the determined acoustic parameters may correspond to any other suitable parameters.

Furthermore, the controller 110 may be configured to determine that one or more components of the vehicle 10 and/or the implement 12 are worn or damaged when the determined acoustic parameters differ by at least a predetermined amount. In general, similar components of the vehicle and/or the implement 12 may generate the same or similar sounds during operation. For example, each of the ground engaging tools (e.g., the shanks 50) of the implement 12 may generate sounds having the same or similar acoustic parameters (e.g., amplitudes, frequencies, pitches, intensities, and/or the like) when working or otherwise engaging the soil. In this regard, a difference in the acoustic parameters associated with the tools may indicate that one of the tools is worn or damaged. For instance, when one of the tools contacts a large or immovable rock or boulder (thereby incurring wear and/or damage from the impact), the acoustic parameter(s) associated with such tool may change relative to the acoustic parameters of other tools (e.g., the intensity of the sound emitted by the tool contacting the rock may increase relative to the other tools). Such a change in the acoustic parameter(s) may be due to the collision or contact with the large or immovable rock or boulder itself or due to wear/damaged damage incurred by the tool(s) as a result of the collision/contact. As such, the controller 110 may be configured to compare the determined acoustic parameters and determine that the associated components of the vehicle 10 and/or the implement 12 are worn or damaged when the acoustic parameters differ by at least a predetermined amount.

In one embodiment, the controller 110 may be configured to determine when the first and/or second shanks 50A, 50B of the implement 12 are worn or damaged based on the differential between associated first and second acoustic parameters. Specifically, as indicated above, the implement 12 may include the first acoustic sensor 104 positioned adjacent to the first shank 50A and the second acoustic sensor 106 positioned adjacent to the second shank 50B. As such, the controller 110 may be configured to determine a first acoustic parameter associated with the operation of the first shank 50A based on acoustic data received from the first acoustic sensor 104. Similarly, the controller 110 may be configured to determine a second acoustic parameter associated with the operation of the second shank 50B based on acoustic data received from the second acoustic sensor 106. Thereafter, the controller 110 may be configured to compare the first and second determined acoustic parameters. When the first and second acoustic parameters differ by at least the predetermined amount, the controller 110 may be configured to determine that the first and/or second shanks 50A, 50B are incurring wear or damage.

It should be appreciated that the controller 110 may be configured to determine the differential between the acoustic parameters in any suitable manner. For example, as described above, in embodiments where the controller 110 is determining a differential between two acoustic parameters, the controller 110 may simply subtract one acoustic parameter from the other acoustic parameter. However, as indicated above, the controller 110 may, in some embodiments, determine a differential between three or more acoustic parameters (e.g., acoustic parameters associated with three or more tools on the vehicle 10 and/or the implement 12). In such embodiments, the controller 110 may determine an average value of the three or more acoustic parameters and then determine the differential between each acoustic parameter and the average value.

Moreover, it should be appreciated that the predetermined amount used by the controller 110 to compare the acoustic parameters may be selected to prevent the controller 110 from inferring or determining that components of the vehicle 10 and/or implement 12 are worn or damaged when only minor differences exist between the detected acoustic parameters. In general, the acoustic parameters of the sounds generated by the various components of the vehicle 10 and/or the implement 12 may experience minor variations during operation. For example, two ground engaging tools of the implement 12 may simultaneously encounter differing soil conditions such that the acoustic parameter associated with one of the ground engaging tools differs slightly from the acoustic parameter associated with the other ground engaging tool. Such a minor variation may be expected during operation and is generally not indicative of wear or damage. As such, the predetermined amount may be a differential between the acoustic parameters that is great enough to be indicative of wear or damage.

Furthermore, in one embodiment, the controller 110 may be configured to determine that one or more components of the vehicle 10 and/or the implement 12 are worn or damaged when the determined acoustic parameters differ by at least the predetermined amount across a predetermined time period. In certain instances, the operating or field conditions may be such that, during operation of the vehicle/implement 10/12, the determined acoustic parameters may differ by the predetermined amount for only a brief or momentary time period. For example, when one of the tools (e.g., one of the shanks 50) contacts a small or movable rock (e.g., in rocky soil) or field trash, the acoustic parameter(s) associated with such tool may change briefly relative to the acoustic parameters of other tools. However, unlike contact with large or immovable rocks and boulders, the acoustic parameter differential may be present for only a short time period. In this regard, such a brief acoustic parameter differential may generally not be indicative of wear or damage to the tools of the implement 12 as such tools are generally designed to withstand impact from small rocks and field trash. As such, in one embodiment, when it is determined that a differential exists between the acoustic parameters, the controller 110 may be configured to monitor the time period across which the differential exists. When the acoustic parameter differential dissipates before the predetermined time period has elapsed, the controller 110 may simply ignore the differential as it is likely that the differential is generally not indicative of wear or damage. However, when the differential persists for at least the predetermined time period, the controller 110 may determine that the associated components of the vehicle 10 and/or the implement 12 are worn or damaged.

Figure 4:
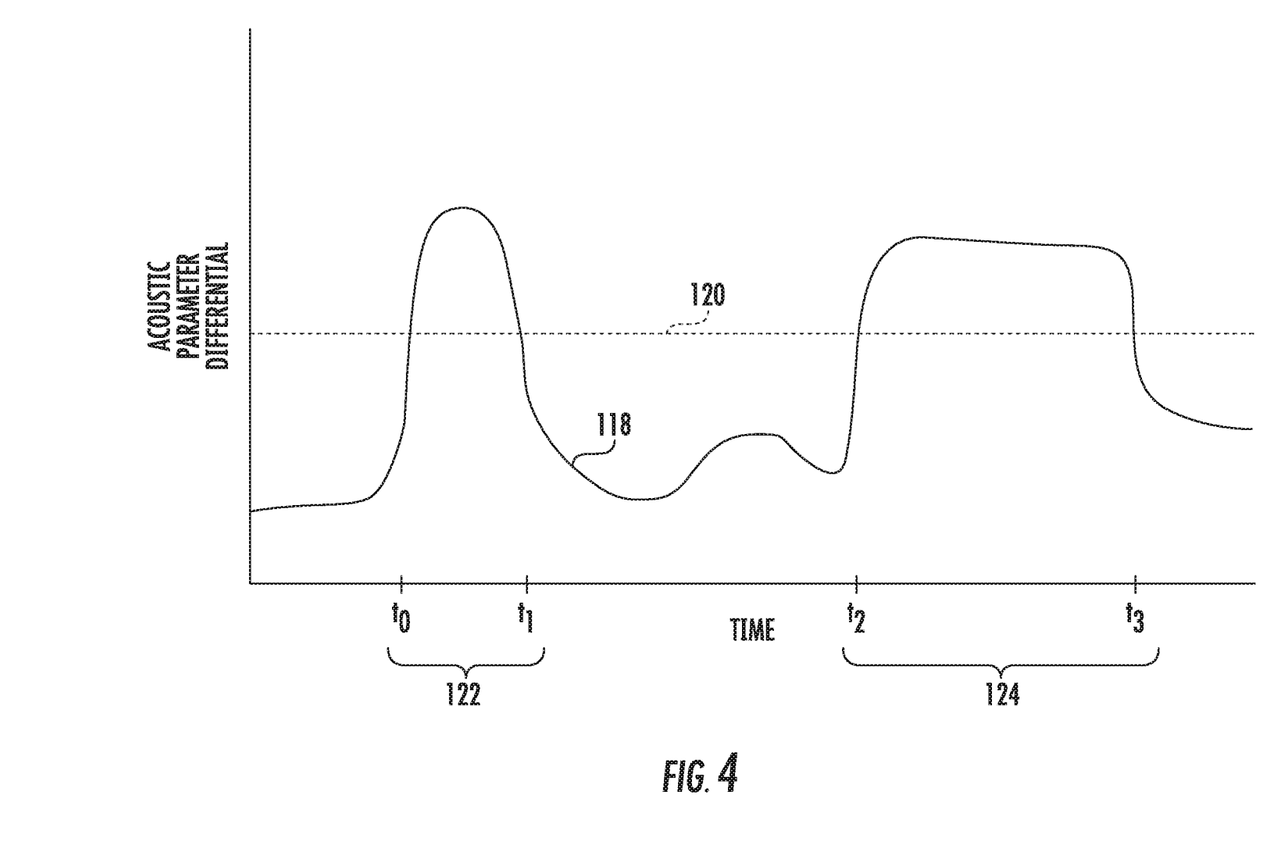
FIG. 4 illustrates a graphical view of an example dataset charting an acoustic parameter differential relative to a predetermined differential amount over time in accordance with aspects of the present subject matter.

For instance, FIG. 4 illustrates a graphical view of an example dataset charting an acoustic parameter differential (e.g., as indicated by solid line 118) associated with a plurality of components (e.g., two or of the shanks 50) of the vehicle 10 and/or implement 12 relative to a predetermined differential amount (e.g., as indicated by dashed line 120) over time as monitored by the controller 110. As shown in FIG. 4, during various different time periods, the acoustic parameter differential 118 exceeds the predetermined amount, such as during a first time period 122 between time $t_0$ and time $t_1$ and a second time period 124 between time $t_2$ and time $t_3$. In such instances, the controller 110 may be configured to identify the length of each time period and compare it to the predetermined time period. When the length of any of such time periods exceeds the predetermined time period, the controller 110 may determine that the associated components of the vehicle 10 and/or implement 12 are worn or damaged. For instance, in the example dataset of FIG. 4, it may be assumed that the first time period 122 is less than the predetermined time period, while the second time period 124 exceeds the predetermined time period. In such instance, the acoustic parameter differential 118 occurring across the first time period 122 may be indicative of contact with a small or movable rock or field trash, which may not cause wear or damage to the associated components. In contrast, the acoustic parameter differential occurring across second time period 124 may be indicative of contact with a large or immovable rock or boulder, which may cause wear or damage to the associated components.

It should be appreciated that the predetermined time period may generally be selected to prevent the controller 110 from determining that components of the vehicle 10 and/or the implement 12 are worn or damaged when the acoustic parameter differential is sufficiently short such that it is indicative of contact with small rocks, field trash, and/or the like. For instance, in one embodiment, the predetermined time period threshold may be less than about 2 seconds, such as less than about 1 second or less than about 0.5 seconds.

Referring again to FIG. 3, in several embodiments, the controller 110 may be configured to initiate one or more control actions when it is determined that a component(s) of the vehicle 10 and/or the implement 12 is worn/damaged. In general, such control action(s) may be associated with or otherwise intended to prevent further wear and/or damage to the component(s) of the vehicle/implement 10/12. For example, in one embodiment, when it is determined that a component(s) of the vehicle 10 and/or the implement 12 is worn, the controller 110 may be configured to notify the operator of vehicle/implement 10/12 that the component(s) are worn/damaged. Specifically, in one embodiment, the controller 110 may be configured to transmit instructions to the user interface 102 (e.g., the communicative link 116) instructing the user interface 102 to provide a notification to the operator of the vehicle/implement 10/12 (e.g., by causing a visual or audible notification or indicator to be presented to the operator) indicating that one or more components of the vehicle 10 and/or implement 12 are worn or damaged. In such instances, the operator may then choose to initiate any suitable corrective action he/she believes is necessary, such as adjusting one or more operating parameters of the vehicle 10 and/or the implement 12.

Moreover, in several embodiments, the controller 110 may be configured to automatically adjust one or more operating parameters of the vehicle 10 and/or the implement 12 when it is determined one or more components of the vehicle 10 and/or implement 12 are worn or damaged. Specifically, in one embodiment, the controller 110 may be configured to initiate adjustment of the penetration depth(s) of and/or downforce being applied to one or more ground engaging tools (e.g., the shanks 50, the harrows 52, and/or the baskets 56) of the implement 12. For example, the controller 110 may be configured transmit instructions to the tool actuator(s) 108 (e.g., via the communicative link 116) instructing the actuator(s) 108 to adjust the penetration depth(s) of and/or downforce being applied to the associated tool(s).

Furthermore, in one embodiment, the controller 110 may be configured to automatically adjust the ground speed at which the vehicle/implement 10/12 is traveling across the field when it is determined one or more components of the vehicle 10 and/or implement 12 are worn or damaged. Specifically, the controller 110 may be configured to transmit instructions to the engine 24 and/or the transmission 26 (e.g., via the communicative link 116) instructing the engine 24 and/or the transmission 26 to adjust their operation. For example, the controller 110 may instruct the engine 24 to vary its power output and/or the transmission 26 to upshift or downshift to increase or decrease the ground speed of the vehicle/implement 10/12 in a manner that reduces or minimizes further wear or damage to the components of the vehicle 10 and/or the implement 12. However, it should be appreciated that, in alternative embodiments, the controller 110 may be configured to transmit instruction to any other suitable components (e.g., braking actuators) of the vehicle 10 and/or the implement 12 such that the ground speed of the vehicle/implement 10/12 is adjusted. Furthermore, it should be appreciated that any other suitable parameter(s) the vehicle 10 and/or the implement 12 may be adjusted when it is determined one or more components of the vehicle 10 and/or implement 12 are worn or damaged.

Figure 5:
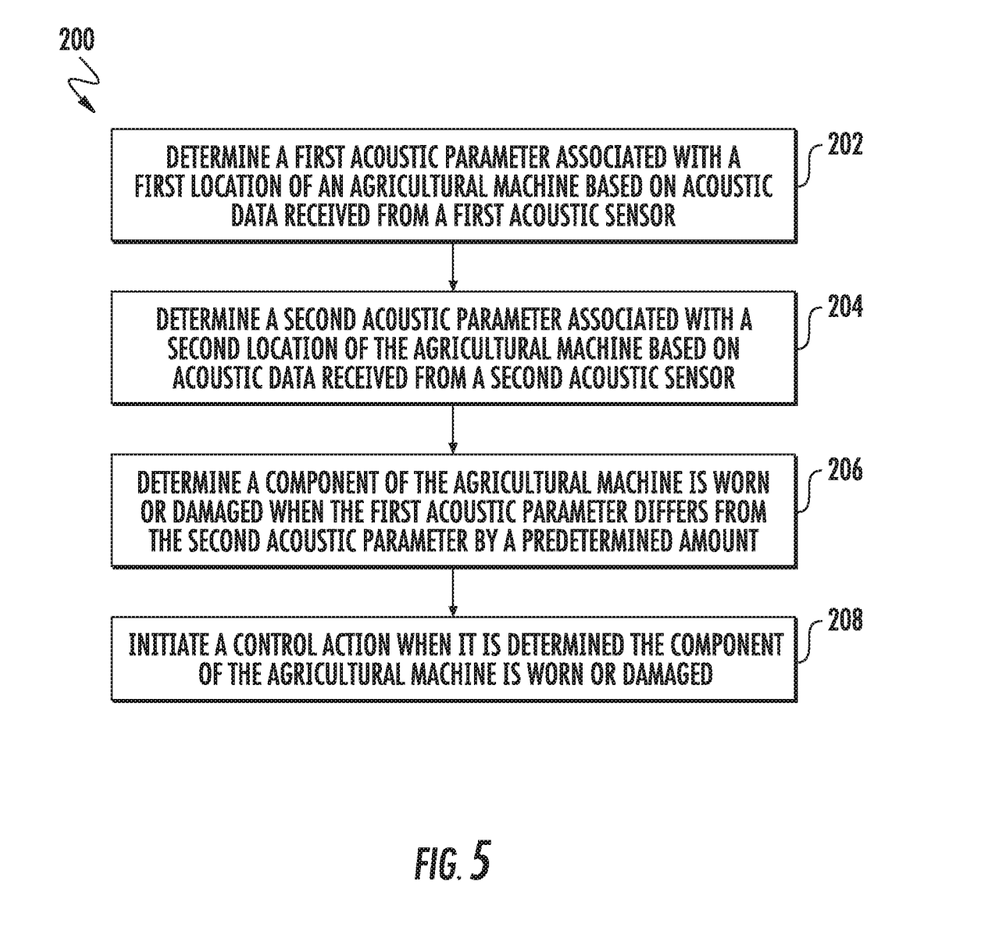
FIG. 5 illustrates a flow diagram of one embodiment of a method for detecting worn or damaged components of an agricultural machine in accordance with aspects of the present subject matter.

Referring now to FIG. 5, a flow diagram of one embodiment of a method 200 for detecting worn or damaged components of an agricultural machine is illustrated in accordance with aspects of the present subject matter. In general, the method 200 will be described herein with reference to the vehicle/implement 10/12 and the system 100 described above with reference to FIGS. 1-4. However, it should be appreciated by those of ordinary skill in the art that the disclosed method 200 may generally be implemented with any agricultural machine having any suitable machine configuration and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include determining, with a computing device, a first acoustic parameter associated with a first location of an agricultural machine based on acoustic data received from a first acoustic sensor. For instance, as described above, the controller 110 may be configured to determine a first acoustic parameter associated with a first location of an implement 12 based on acoustic data received from a first acoustic sensor 104.

Additionally, at (204), the method 200 may include determining, with the computing device, a second acoustic parameter associated with a second location of the agricultural machine based on acoustic data received from a second acoustic sensor. For instance, as described above, the controller 110 may be configured to determine a second acoustic parameter associated with a second location of the implement 12 based on acoustic data received from a second acoustic sensor 104.

Moreover, as shown in FIG. 5, at (206), the method 200 may include determining, with the computing device, a component of the agricultural machine is worn when the first acoustic parameter differs from the second acoustic parameter by a predetermined amount. For instance, as described above, the controller 110 may be configured to compare the first and second acoustic parameters and determine that a component of the vehicle 10 and/or the implement 12 is worn or damaged when the first and second acoustic parameters differ by at least a predetermined amount.

Furthermore, at (208), the method 200 may include initiating, with the computing device, a control action when it is determined the component of the agricultural machine is worn. For instance, as described above, when it is determined that one or more components of the vehicle 10 and/or the implement 12 are worn or damaged, the controller 110 may be configured to initiate one or more control actions, such as adjusting one or more operating parameters of the vehicle 10 and/or implement 12. Such operating parameters may include the ground speed of the vehicle/implement 10/12 and/or the penetration depth(s) of a ground engaging tool (e.g., a shank(s) 50) of the implement 12.

It is to be understood that the steps of the method 200 are performed by the controller 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 110 described herein, such as the method 200, is implemented in software code or instructions which are tangibly stored on a tangible computer readable medium. The controller 110 loads the software code or instructions via a direct interface with the computer readable medium or via a wired and/or wireless network. Upon loading and executing such software code or instructions by the controller 110, the controller 110 may perform any of the functionality of the controller 110 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for detecting worn or damaged components of an agricultural machine, the system comprising:
   an agricultural machine frame;
   a first ground engaging tool mounted on the agricultural machine frame at a first location;
   a first acoustic sensor configured to capture data indicative of a sound being emitted by the first ground engaging tool at the first location;
   a second ground engaging tool mounted on the agricultural machine frame at a second location, the second location being spaced apart from the first location;
   a second acoustic sensor configured to capture data indicative of a sound being emitted by the second ground engaging tool at the second location;
   a controller communicatively coupled to the first acoustic sensor and the second acoustic sensor, the controller configured to:
      determine a first pitch emitted by the first ground engaging tool at the first location based on acoustic data received from the first acoustic sensor;
      determine a second pitch emitted by the second ground engaging tool at the second location based on acoustic data received from the second acoustic sensor;
      compare the first pitch and the second pitch to determine when the first pitch differs from the second pitch; and
      determine one of the first ground engaging tool or the second ground engaging tool is worn or damaged when the first pitch differs from the second pitch by a predetermined amount.

2. The system of claim 1, wherein the controller is configured to determine that the one of the first ground engaging tool or the second ground engaging tool is worn or damaged when the first pitch differs from the second pitch by the predetermined amount across a predetermined time period.

3. The system of claim 1, wherein the controller is further configured to initiate a control action when it is determined the one of the first ground engaging tool or the second ground engaging tool of the agricultural machine is worn or damaged.

4. The system of claim 3, wherein the control action comprises notifying an operator of the agricultural machine that the one of the first ground engaging tool or the second ground engaging tool of the agricultural machine is worn or damaged.

5. The system of claim 3, wherein the control action comprises adjusting an operating parameter of the agricultural machine.

6. The system of claim 5, wherein the operating parameter comprises at least one of a ground speed of the agricultural machine or a penetration depth of the one of the first ground engaging tool or the second ground engaging tool.

7. The system of claim 1, wherein the first location is spaced apart from the second location along at least one of a longitudinal direction or a lateral direction of the agricultural machine.

8. The system of claim 1, wherein the agricultural machine comprises an engine, the first acoustic sensor and the second acoustic sensor being acoustically isolated from the engine.

9. The system of claim 1, wherein the first ground engaging tool comprises a first shank and the second ground engaging tool comprises a second shank.

10. A method for detecting worn or damaged components of an agricultural machine, the agricultural machine including a first acoustic sensor positioned at a first location on the agricultural machine and a second acoustic sensor positioned at a second location on the agricultural machine, the second location being spaced apart from the first location, the method comprising:
- determining, with a computing device, a first pitch emitted by the first ground engaging tool at a first location of the agricultural machine based on acoustic data received from the first acoustic sensor;
- determining, with the computing device, a second pitch emitted by the second ground engaging tool at the second location of the agricultural machine based on acoustic data received from the second acoustic sensor;
- determining, with the computing device, a component of the agricultural machine is worn or damaged when the first pitch differs from the second pitch by a predetermined amount; and
- initiating, with the computing device, a control action when it is determined the component of the agricultural machine is worn or damaged.

11. The method of claim 10, wherein determining the component is worn or damaged comprises determining, with the computing device, that the component is worn or damaged when the first pitch differs from the second pitch by the predetermined amount across a predetermined time period.

12. The method of claim 10, wherein the control action comprises notifying an operator of the agricultural machine that the component of the agricultural machine is worn or damaged.

13. The method of claim 10, wherein the control action comprises adjusting an operating parameter of the agricultural machine.

14. The method of claim 13, wherein the operating parameter comprises at least one of a ground speed of the agricultural machine or a penetration depth of the one of the first ground engaging tool or the second ground engaging tool of the agricultural machine.

15. The method of claim 10, wherein the first location is spaced apart from the second location along at least one of a longitudinal direction or a lateral direction of the agricultural machine.

16. The method of claim 10, wherein the agricultural machine further comprises an engine, the first acoustic sensor and the second acoustic sensor being acoustically isolated from the engine.

* * * * *